(12) United States Patent
Ferguson et al.

(10) Patent No.: US 9,002,812 B2
(45) Date of Patent: Apr. 7, 2015

(54) CHECKSUM AND HASHING OPERATIONS RESILIENT TO MALICIOUS INPUT DATA

(71) Applicant: Microsoft Corporation, Redmond, WA (US)

(72) Inventors: Niels Ferguson, Redmond, WA (US); Reid Borsuk, Bellevue, WA (US); Jeffrey Cooperstein, Redmond, WA (US); Matthew Ellis, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 29 days.

(21) Appl. No.: 13/680,116

(22) Filed: Nov. 19, 2012

(65) Prior Publication Data

US 2013/0262421 A1    Oct. 3, 2013

Related U.S. Application Data

(60) Provisional application No. 61/618,839, filed on Apr. 1, 2012.

(51) Int. Cl.
*G06F 17/00* (2006.01)
*G06F 21/00* (2013.01)
*G06F 21/50* (2013.01)

(52) U.S. Cl.
CPC ............... *G06F 21/00* (2013.01); *G06F 21/50* (2013.01)

(58) Field of Classification Search
CPC ..... G06F 21/10; G06F 2211/007; G06F 8/60; G06F 11/004; G06F 11/0781; G06F 11/0784; G06F 21/57; G06F 21/73; G06F 21/64; G06F 21/71; G06F 21/74; G06F 21/78; G06F 21/75; G06F 21/554; G06F 2221/2107
See application file for complete search history.

(56) References Cited

U.S. PATENT DOCUMENTS

| | | | | |
|---|---|---|---|---|
| 5,630,054 | A * | 5/1997 | Trang | 714/52 |
| 6,182,267 | B1 * | 1/2001 | Kidd et al. | 714/807 |
| 2005/0108555 | A1 * | 5/2005 | Sibert | 713/187 |
| 2009/0271634 | A1 * | 10/2009 | Boult et al. | 713/186 |

(Continued)

OTHER PUBLICATIONS

Doering, et al., "Fast and flexible CRC calculation", Retrieved at <<http://ieeexplore.ieee.org/stamp/stamp.jsp?tp=&arnumber=1260645>>, Electronics Letters, Jan. 8, 2004, pp. 10-11.

(Continued)

*Primary Examiner* — Angelica Ruiz
(74) *Attorney, Agent, or Firm* — Timothy Churna; Kate Drakos; Micky Minhas (57) ABSTRACT

A resilient hashing system leverages a fast, non-cryptographic hash/checksum function that has good diffusion properties while remaining reasonably efficient on modern central processing units (CPUs). The hash function uses random secret data so that hash keys for particular data are difficult to predict. Due to its internal structure, well-chosen random secret data is difficult for an attacker to counter without having access to the direct output of the hash function. At every stage of the block function, there are at least two operations that can be performed in parallel, increasing performance on modern superscalar CPUs. Thus, the resilient hashing system provides a hash table and checksum that can be used in Internet-facing or other vulnerable sources of input data to manage performance in the face of malicious attacks.

19 Claims, 5 Drawing Sheets

(56) References Cited

U.S. PATENT DOCUMENTS

2010/0275063 A1* 10/2010 Walmsley et al. .............. 714/32
2010/0306294 A1   12/2010 Schneider
2013/0061036 A1*   3/2013 Oliver ............................ 713/150

OTHER PUBLICATIONS

Feldmeier, David C., "Fast software implementation of error detection codes", Retrieved at <<http://ieeexplore.ieee.org/stamp/stamp.jsp?tp=&arnumber=477710>>, IEEE/ACM Transactions on Networking, Dec. 1995, pp. 640-651.

Karasek, et al., "Towards an automatic design of non-cryptographic hash function", Retrieved at <<http://ieeexplore.ieee.org/stamp/stamp.jsp?tp=&arnumber=6043785>>, 34th International Conference on Telecommunications and Signal Processing (TSP), Aug. 18, 2011, pp. 19-23.

Hua, et al., "Non-crypto Hardware Hash Functions for High Performance Networking ASICs", Retrieved at <<http://ieeexplore.ieee.org/stamp/stamp.jsp?tp=&arnumber=6062728>>, Seventh ACM/IEEE Symposium on Architectures for Networking and Communications Systems (ANCS), Oct. 3, 2011, pp. 156-166.

Bar-Yosef, et al., "Remote Algorithmic Complexity Attacks against Randomized Hash Tables", Retrieved at <<http://www.eng.tau.ac.il/~yash/C2_039_Wool.pdf>>, MobiCom'10, 2007, pp. 1-8.

Lemire, Daniel, "Use random hashing if you care about security?", Retrieved at <<http://lemire.me/blog/archives/2012/01/17/use-random-hashing-if-you-care-about-security/>>, Jan. 17, 2012, pp. 10.

Crosby, et al., "Denial of Service via Algorithmic Complexity Attacks", Retrieved at <<http://www.cs.rice.edu/~scrosby/hash/CrosbyWallach_UsenixSec2003.pdf>>, 12th USENIX Security Symposium, Aug. 4, 2003, pp. 1-16.

Edward, William, "Hash table attacks—impervious hash tables", Retrieved at <<http://www.cs.rice.edu/~scrosby/hash/CrosbyWallach_UsenixSec2003.pdf>>, http://williamedwardscodertumblr.com/post/14939418095/hash-table-attacks-impervious-hash-tables>>, Dec. 28, 2011, pp. 7.

"International Search Report", Mailed Date: Jul. 1, 2013, Application No. PCT/US2013/034513, Filed Date: Mar. 29, 2013, 13 Pages.

"Efficient Randomized Hash Function", I P. com Journal, Dec. 2, 2009, 4 pages.

Tillich, et al., "Compact Hardware Implementations of the SHA-3 Candidates Arirang, Blake, Grostl, and Skein", Jul. 14, 2009, 6 pages.

Tillich, Stefan, "Hardware Implementation of the SHA-3 Candidate Skein", Apr. 6, 2009, 10 pages.

* cited by examiner

CHECKSUM AND HASHING OPERATIONS RESILIENT TO MALICIOUS INPUT DATA

CROSS-REFERENCE TO RELATED APPLICATIONS

The present application claims the benefit of U.S. Provisional Patent Application No. 61/618,839 entitled "CHECKSUM AND HASHING OPERATIONS RESILIENT TO MALICIOUS INPUT DATA", and filed on Feb. 4, 2012, which is hereby incorporated by reference.

BACKGROUND

A hash table is a data structure in computer science that implements an associative array between particular buckets identified by keys, and the values stored there. A hash function is used to determine a key for any particular value. A hash function can be any operation that generates a suitable key for a particular hash table's usage. Hash functions are generally chosen so that the distribution of keys is good over a particular expected set of values. A perfect hash function is used to denominate a hash function that does a good job of distributing values by selecting unique keys and thus does not cause any collisions. A collision occurs when two values map to the same key and thus the same hash bucket. Whether collisions are a problem or not depends on how the hash table is being used, but where collisions matter a perfect hash function avoids extra logic for handling collisions.

Hash functions often use a technique referred to as a checksum for determining hash keys from input values. A checksum can be thought of as a summary of data. A long set of bytes of data when run through a checksum function will generally produce a fixed-length value (e.g., 32 bits or 64 bits) referred to as the checksum. This value can then be compared to the checksum of other data or of the same data at a different time to quickly detect changes to the data. The checksum function is generally chosen so that even small changes to the data will result in a different checksum value, so that changes can be efficiently detected. The most common checksum function for detecting data changes is a group of algorithms known as cyclic redundancy check (CRC). Cryptographic hash algorithms, such as MD5 and SHA1 are also commonly used.

Hash tables experience worst-case performance when large numbers of input values all have the same key and thus are hashed into the same bucket. This can be caused by either poor hash function choice or maliciously chosen input that takes advantage of the predictable nature of the hashing function. Non-cryptographic hash codes (such as those used in the hash table data structure) can be predictably calculated outside of an application's boundaries. A malicious attacker can use this to force many entries into the same hash table location, deliberately creating worst-case performance, and to cause substantial delays in calculation over otherwise acceptable input data.

One potential solution to the latter is to mix secret data into the predictable hash function that is not known to the attacker. However, existing hash functions are built for either speed, good distribution of outputs over the input data, or high likelihood that related inputs are spread throughout the table evenly. There are few good places to include extra secret data in existing functions that attackers cannot work around. There are several solutions to dealing with malicious inputs to hash tables. One is to use a hash table with good worst-case performance. Unfortunately, such hash tables are more complicated and sometimes have poorer average performance.

SUMMARY

A resilient hashing system is described herein that leverages a fast, non-cryptographic hash/checksum function that has good diffusion properties while remaining reasonably efficient on modern central processing units (CPUs). The hash function uses random secret data so that hash keys for particular data are difficult to predict. Due to its internal structure, well-chosen random secret data is difficult for an attacker to counter without having access to the direct output of the hash function. At every stage of the block function, there are at least two operations that can be performed in parallel, increasing performance on modern superscalar CPUs. Good diffusion properties mean that small amounts of entropy in the input data greatly affect the output. Non-cryptographic simply means that the function does not have the processing overhead typically associated with cryptographic functions where performance would be unacceptable for frequently used data structures, because the hash function does not provide the properties of a cryptographic hash function, such as collision-resistance and second pre-image resistance. Non-cryptographic hash functions can be significantly faster than cryptographic ones. Thus, the resilient hashing system provides a hash table and checksum that can be used in Internet-facing or other vulnerable sources of input data to manage performance in the face of malicious attacks.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A resilient hashing system is described herein that leverages a fast, non-cryptographic hash/checksum function that has good diffusion properties while remaining reasonably efficient on modern central processing units (CPUs). The hash function uses random secret data so that hash keys for particular data are difficult to predict. Due to its internal structure, well-chosen random secret data is difficult for an attacker to counter without having access to the direct output of the hash function. In some embodiments, the hash function provides for high parallelism. At every stage of the block function, there are at least two operations that can be performed in parallel, increasing performance on modern superscalar CPUs. In software, this hash function can even be faster than CRC. Good diffusion properties mean that small amounts of entropy in the input data greatly affect the output. Non-cryptographic simply means that the function does not have the processing overhead typically associated with cryptographic functions where performance would be unacceptable for frequently used data structures, because the hash function does not provide the properties of a cryptographic hash function, such as collision-resistance and second pre-image resistance. Non-cryptographic hash functions can be significantly faster than cryptographic ones.

The resilient hashing system provides at least three advancements over existing hash tables. First, the internal structure of the system uses a hashing function that has low overhead and high parallelizability on modern superscalar CPUs. Second, the system uses rotation constants (described further herein) derived from an exhaustive search to be both resilient against predictable output modification and high in diffusion. Rotation constants refer to how data is modified to calculate a checksum using CPU rotation instructions. Third, the system's application to a hash table to provide randomized location of data values and thus to avoid potential denial of service attacks improves upon existing hash tables. Although the industry understands the benefit that randomized hash tables provide today, the resilient hashing system improves the security of these implementations with little to no performance degradation. Thus, the resilient hashing system provides a hash table and checksum that can be used in Internet-facing or other vulnerable sources of input data to manage performance in the face of malicious attacks.

One application of the resilient hashing system is in a web-based system. Web frameworks such as MICROSOFT™ ASP.NET provide an environment in which web application developers can build solutions to a wide variety of problems. Such frameworks often provide a library of well-known data structures and algorithms that application developers can use to build their solutions. These solutions are then often deployed to the public Internet or to other areas where attackers and others may attempt to compromise the operation or performance of the application. One type of attack is known as a denial of service (DoS), and refers to an inability for legitimate users of a system to achieve the results they want because malicious users have compromised the system in some way. Degrading performance of hash tables is one among many such possible DoS attacks. The resilient hashing system provides a hash table and method that can be applied to input data in this type of environment, and that can manage and maintain good performance even in the event of malicious activity and attempts to deny good service to legitimate users.

Recent DoS attacks rely on an adversary constructing many hash table keys that hash to the same index, and sending them all to a server in a request. The server inserts all the items in a hash table, which takes time $O(n^2)$ if they all have the same hash value. There are several possible mitigations, including the use of a hash table with $O(n \log n)$ worst-case behavior, but the simplest solution is to use a randomizable hash function to compute the index into the hash table. As long as the attacker cannot predict when two keys will hash to the same table entry, the DoS attack fails. This is the mitigation provided by the resilient hashing system.

The following paragraphs describe one checksum function, called Marvin32, which exhibits the properties described above, although other functions can be used with the system herein to achieve similar results. The function described builds upon the Helix/Phelix algorithms and the Skein hash function. The Skein hash function is one of five finalists that may become the SHA3 algorithm to replace the aging SHA1 and SHA2 specifications. The method described herein improves upon Skein to provide greater performance potential.

Marvin32 takes the following inputs: 8 bytes Seed: $s_0, s_1, \ldots, s_7$, N bytes Data: $d_0, d_1, \ldots, d_{\{N-1\}} \forall N \geq 0$, and produces an 8-byte checksum $c_0, c_1, \ldots, c_7$ as output. The Seed is converted to two 32-bit words $(S_0, S_1)$ using the least-significant-byte-first convention:

$$S_i := s_{\{4i\}} + 2^8 * s_{\{4i+1\}} + 2^{16} * s_{\{4i+2\}} 2^{24} * s_{\{4i+3\}}$$

The data bytes $d_0, \ldots, d_{\{N-1\}}$ are processed as follows:
Append a byte with value 0x80: $d_N := 128$
Append 4, 5, 6, or 7 bytes with value 0 so that the total length is a multiple of 4: $d_j := 0$ for $j > N$
Let $K := \mathrm{ceil}((N+5)/4)$ be the number of 32-bit words $D_0, \ldots, D_{\{K-1\}}$ we derive from the data using the least-significant-byte-first convention:

$$D_i := d_{\{4i\}} + 2^8 * d_{\{4i+1\}} + 2^{16} * d_{\{4i+2\}} + 2^{24} * d_{\{4i+3\}} \text{ for } i = 0, \ldots, K-1$$

We define the function Block(a, b) that takes two 32-bit words as input and returns two 32-bit words as output. Block (A0, B0):
  B1=B0 xor A0; A1=rotate_left(A0, 20);
  A2=A1+B1 mod $2^{32}$; B2=rotate_left(B1, 9);
  B3=B2 xor A2; A3=rotate_left(A2, 27);
  A4=A3+B3 mod $2^{32}$; B4=rotate_left(B3, 19);
  return (a4, b4)

Here 'xor' is the bitwise exclusive OR operation, the additions are all modulo 2^32, and the rotate_left function rotates its first argument left by a number of bits specified by the second argument.

Marvin32 is now defined by:

$$P_0 := S_0;$$

$$Q_0 := S_1;$$

$$(P_{\{i+1\}}, Q_{\{i+1\}}) := \mathrm{Block}(D_i + P_i \mod 2^{32}, Q_i) \text{ for } i = 0, \ldots, K-1$$

The final words $(P_K, Q_K)$ form the result of the checksum function. They are converted to 8 bytes using the least-significant-byte-first convention:

$$C_0 := P_K$$

$$C_1 := Q_K$$

$$c_i := \mathrm{floor}\left(\frac{C_{\{\mathrm{floor}(\frac{i}{4})\}}}{2^{\{8*(i \bmod 4)\}}}\right) \bmod 256$$

The bytes $c_0, \ldots, c_7$ are the output bytes.

If no seed is required, a default seed can be used that consists of the first 8 bytes of the SHA-256 hash of the 8-byte string "Marvin32" (byte values b7 93 08 cd ce d9 3c d5). Use of the all-zero seed value is discouraged. The all-zero state is a fixed point of the Block( ) function, and as long as all inputs are zero the internal state will remain zero. For randomly chosen seed values this happens with low probability ($2^{\{-64\}}$) which is not a problem for a checksum function. We recommend against checking a random seed for the all-zero value and then changing it; the extra code and risk of errors is not worth the gain. The use of a fixed zero seed raises the concern that some accidental changes (e.g., adding 16 zero bytes to the front of the message) will not affect the result of the checksum function.

The basic structure design is derived from a class of cryptographic algorithms called ARX, for Add, Rotate, and Xor. Similar designs are used in Helix, Phelix, Michael, and Skein. At every stage of the block function, there are at least two operations that can be performed in parallel; this increases performance on modern superscalar CPUs.

The default seed value is chosen to be verifiably non-malicious. Using SHA-256 is a trivial way to generate 8 bytes with no structure that could relate to the Marvin design. The rotation constants are chosen by computer search. There are 1,048,576 possible sets of rotation constants. We first eliminated those containing rotations by 0, 1, or 31 leaving 707,281 sets. Rotation by one is undesirable as it moves a bit to its neighbor, which could also be influenced by the carry in the addition. This can lead to undesirable cancellation of a difference. The next test is that the sums of any subset of the rotation constants are different modulo 32. It is possible to find a path through the Block function that uses any subset of the four constants; having two paths with the same overall rotation again increases cancellation of differences. This leaves 73,320 sets of rotation constants.

Next, we look at an approximate measure of the diffusion. We rewrite the Block function to use OR instead of XOR and ADD. We then apply it to the input (1, 0). In this computation, a bit is set if it could be affected through the binary operations and rotates, but ignoring the carries in the addition. As the modified Block function is rotation-invariant, we do not apply it to (2, 0) and other input bit positions. We restrict the set of rotations to those that achieve highest Hamming weight after the application of two consecutive modified Block functions to the input (1, 0). The highest Hamming weight is 38, and 1,326 sets of rotations pass this test.

Finally, we measure the average forward and backward diffusion of differences in the Block function. Given a random input, we flip a random bit in the first word, and measure how many bits are flipped in the output. We do this both for the forward and reverse version. The set (20, 9, 27, 19) consistently scored amongst the highest performing sets of rotation constants under this metric, though other sets of rotation constants can be similarly derived.

Figure 1:
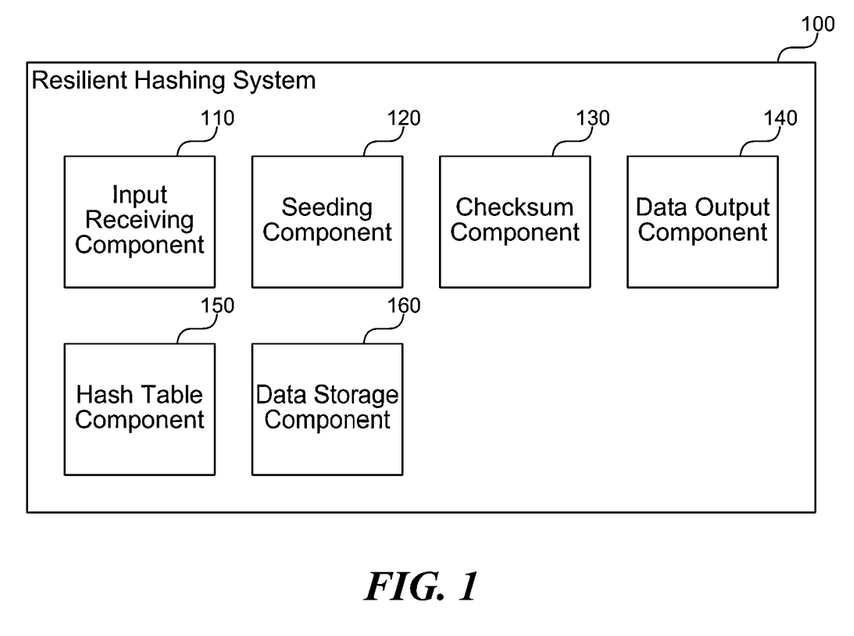
FIG. 1 is a block diagram that illustrates components of the resilient hashing system, in one embodiment.

FIG. 1 is a block diagram that illustrates components of the resilient hashing system, in one embodiment. The system 100 includes an input receiving component 110, a seeding component 120, a checksum component 130, a data output component 140, a hash table component 150, and a data storage component 160. Each of these components is described in further detail herein.

The input receiving component 110 receives input data for which to determine a checksum value. The input data may include any variety of data, including text, binary, image, audiovisual, or other data. The data may include email messages, web form data, hypertext markup language (HTML), software application output, media content, or any other type of data. The system receives input from a user or from software via an application-programming interface (API) or other interface. The system may provide a graphical or programmatic interface through which users or other software can interact with the system to provide configuration, input, and to receive output data. The system may be implemented as one or more modules, as part of a programming library, or in any other suitable form.

The seeding component 120 receives or determines a seed value to use to randomize the checksum values produced by any particular instance of the system. The user of the system (e.g., a software application developer) may provide the seed, which may be determined in whatever manner the user decides, or may rely on the system to use a default seed value or choose a random seed value. The seed may be determined once for any particular instance of the system or may be changed periodically. For example, some implementations may choose to select a new seed each time the system is run while others may choose to select a new seed after a particular period of time to thwart external attempts to guess or extract the seed value.

The checksum component 130 computes a checksum value derived from the received input data and determined seed value. The checksum is determined in a manner that produces high diffusion of the checksum value even for slight variations in the input data. In addition, the checksum is determined in a manner that is difficult to guess for an attacker that has ready access to the data but does not have access to the seed value, which is kept protected within the system 100. In this way, the system is resilient to attacks that attempt to fill particular hash buckets of a hash table that selects hash keys using the checksum function described herein. The checksum component may use an implementation of Marvin32 or other suitable checksum functions to achieve this result.

The data output component 140 provides the computed checksum value as output data to other components of the system or external components. In some cases, a software application may leverage the system 100 simply to produce a checksum. Because the system computes checksums in a manner that is efficient and that uses modern CPU resources effectively, applications may choose the system to produce checksums for a variety of purposes. Those of ordinary skill in the art will recognize numerous software problems that involve the use of a checksum where use the system described herein is well suited. Alternatively or additionally, the system 100 may be applied in a hash table implementation to provide less predictable distribution of data within the hash table.

The hash table component 150 manages a hash table that uses the checksum value as a hash key. A hash table built in such a manner is more resilient than common hash tables to malicious attacks that attempt to overfill particular buckets of the hash table with data values. Filling hash buckets beyond an amount that occurs in normal operation can lead to poor hash table performance and thus can be used to carry out a denial of service attack. By distributing data values with the type of checksum described herein, the system 100 can ensure that an attacker cannot know or easily guess how data will be distributed within the hash table. Without knowing this information, the attacker cannot intentionally degrade the hash table's performance.

The data storage component 160 provides a data store for storing information associated with the system 100. The data may include the hash table, seed value, or other information used by the system. The data store may include one or more in-memory data structures, files, file systems, hard drives, databases, cloud-based storage services, or other facilities for storing data.

The computing device on which the resilient hashing system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored on computer-readable storage media. Any computer-readable media claimed herein include only those media falling within statutorily patentable categories. The system may also include one or more communication links over which data can be transmitted. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, set top boxes, systems on a chip (SOCs), and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
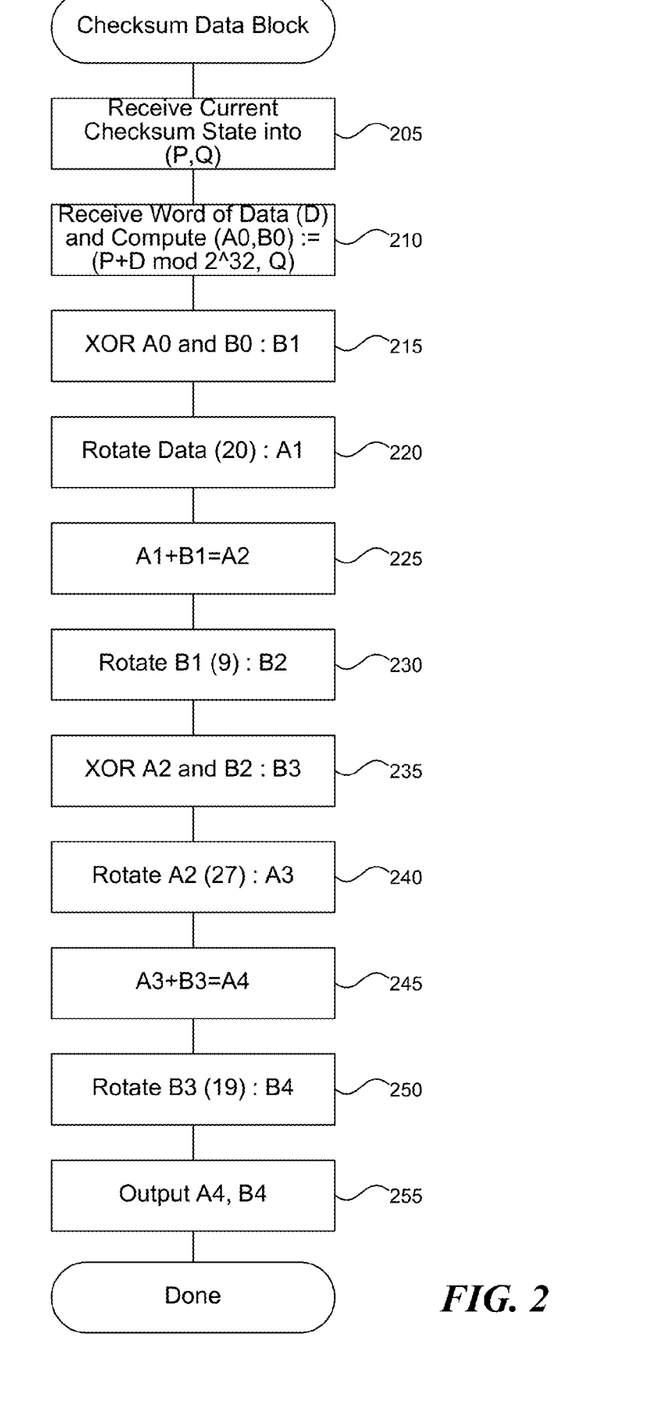
FIG. 2 is a flow diagram that illustrates processing of the resilient hashing system to determine a checksum of data that is difficult for an attacker to guess, in one embodiment.

FIG. 2 is a flow diagram that illustrates processing of the resilient hashing system to determine a checksum of data that is difficult for an attacker to guess, in one embodiment. FIG. 2 shows the processing of a single block of 4 bytes of data. This process may be applied repeatedly to multiple blocks of data to process longer input data and to produce a checksum of a large amount of data. Depending on the implementation of the system, the output checksum may be a fixed-length value (e.g., 32-bits, 64-bits, or other) regardless of the input data size. Beginning in block 205, the system receives a current checksum state into (P, Q). If processing the first block of a checksum computation, this is the seed value. For subsequent blocks, this is the output of the previous block function. The seed value will cause an output checksum to vary from any previous operation using a different seed. The seed value may be chosen in a variety of ways. For example, the implementer of the system may provide a default seed value that can be used when no specific seed value or method of selecting the seed is needed. Alternatively, the user of the system may select the seed using a random or pseudo-random process. The boundary at which a different seed is selected may also vary. For example, some users may choose to use a new seed each time their software is run while others may roll seeds more often, such as every hour. This may be useful for longer running software that uses the system so that the seed changes periodically to thwart attacks.

Continuing in block 210, the system receives a word of input data (D) for which the following steps will determine an output checksum, and computes $(A0, B0):=(P+D \bmod 2^{32}, Q)$. The data may be input data to a software application, data from a previous iteration of running the checksum process, or any other data.

Continuing in block 215, the system performs a logical operation. The logical operation can be a logical XOR operation or other suitable operation, such as XOR A0 and B0 to produce B1. In many cases, the operation will be native to the CPU used to execute the instructions of the system, such that this step can be processed as a single CPU instruction.

Continuing in block 220, the system rotates the input data using a first rotation constant to produce intermediate data A1. The rotation can be a left rotation or other operation that can be implemented by modern CPUs as a single instruction. For example, the INTEL™ x86 architecture provides a 'rol' instruction that rotates data to the left by a specified amount.

The first rotation constant and other rotation constants described herein are selected to produce good diffusion of the output checksum value, and for other properties described herein. The system may be designed to operate with a fixed set of rotation constants or may receive rotation constants as input or configuration data. This allows the system some flexibility if constants are discovered that work better or work better in a particular use of the system.

Many blocks of the system can process data in parallel. For example, the blocks to produce intermediate data A1 and intermediate data B1 can be performed in parallel (i.e., at the same time using separate processing units) on modern superscalar CPUs. This allows the system to produce a checksum faster than many past methods and to more efficiently utilize available hardware resources. Similarly, other steps below may be processed in parallel to reach the output checksum value.

Continuing in block 225, the system combines intermediate data A1 and intermediate data B1 to produce intermediate data A2. The combination may be produced by adding the two intermediate data numbers or by performing another operation that yields similar results. In the case of addition and similar operations, these can be performed in a single CPU instruction for efficiency, just as the other instructions previously described. The system may also make the addition modulo $2^{32}$ or another value to fit the data into a desired length.

Continuing in block 230, the system rotates intermediate data B1 using a second rotation constant to produce intermediate data B2. As described above, the rotation can be a left rotation or other operation that can be implemented by modern CPUs as a single instruction. The second rotation constant and other rotation constants described herein are selected to produce good diffusion of the output checksum value, and for other properties described herein.

Continuing in block 235, the system performs a logical operation that combines intermediate data A2 and intermediate data B2 to produce intermediate data B3. The logical operation can be a logical XOR operation or other suitable operation. In many cases, the operation will be native to the CPU used to execute the instructions of the system, such that this step can be processed as a single CPU instruction.

Continuing in block 240, the system rotates intermediate data A2 using a third rotation constant to produce intermediate data A3. As described above, the rotation can be a left rotation or other operation that can be implemented by modern CPUs as a single instruction. The third rotation constant and other rotation constants described herein are selected to produce good diffusion of the output checksum value, and for other properties described herein.

Continuing in block 245, the system combines intermediate data A3 and intermediate data B3 to produce intermediate data A4. The combination may be produced by adding the two intermediate data numbers or by performing another operation that yields similar results. In the case of addition and similar operations, these can be performed in a single CPU instruction for efficiency, just as the other instructions previously described.

Continuing in block 250, the system rotates intermediate data B3 using a fourth rotation constant to produce intermediate data B4. As described above, the rotation can be a left rotation or other operation that can be implemented by modern CPUs as a single instruction. The fourth rotation constant and other rotation constants described herein are selected to produce good diffusion of the output checksum value, and for other properties described herein.

Continuing in block 255, the system provides intermediate data A4 and intermediate B4 as the input for the next block or if all blocks are complete as the output checksum value. Depending on the purpose and needs of a particular implementation, the system may provide both values A4 and B4 or may combine the values (e.g., through a logical XOR or other operation or making one value the upper bits of a longer value and the other value the lower bits of the longer value). For example, in cases where a 64-bit checksum is desired and the intermediate data A4 and B4 are each 32-bits, the two values can be combined into one 64-bit value. The output may be fed into another iteration of the previous steps that processes more data or may be output to other parts of a software application that use the output checksum value. After block 255, these steps conclude.

Figure 3:
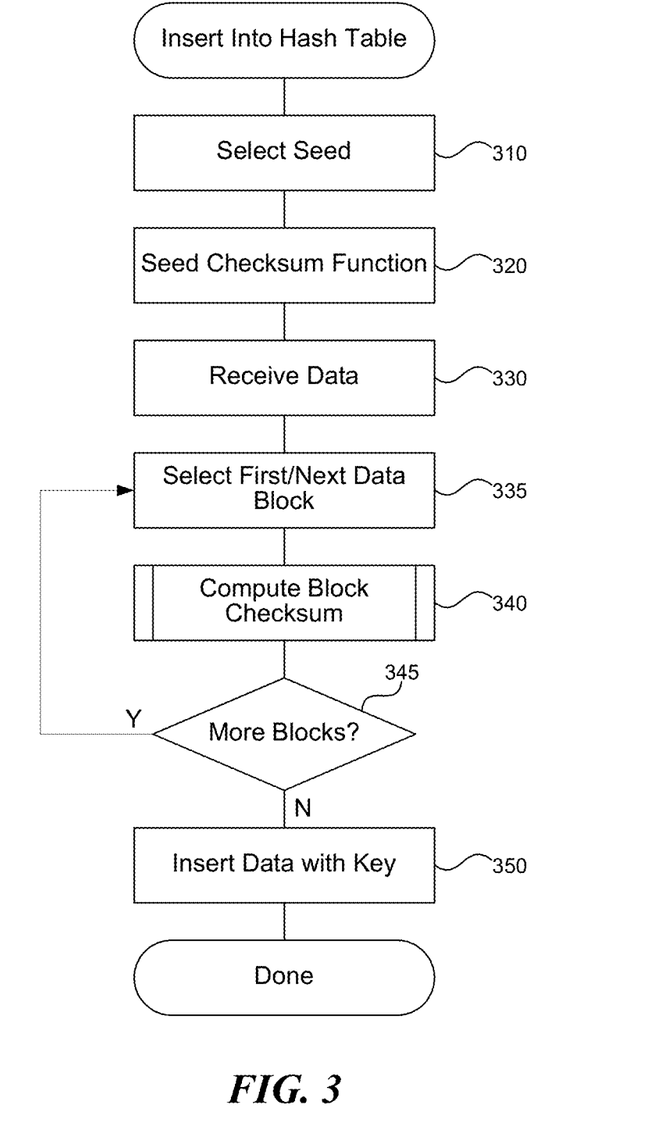
FIG. 3 is a flow diagram that illustrates processing of the resilient hashing system to insert data into a hash table using a resilient hash function, in one embodiment.

FIG. 3 is a flow diagram that illustrates processing of the resilient hashing system to insert data into a hash table using a resilient hash function, in one embodiment. Beginning in block 310, the system selects a seed value that will cause an output checksum to vary from any previous operation using a different seed. The seed value may be chosen in a variety of ways. For example, the implementer of the system may provide a default seed value that can be used when no specific seed value or method of selecting the seed is needed. Alternatively, the user of the system may select the seed using a random or pseudo-random process. The boundary at which a different seed is selected may also vary. For example, some users may choose to use a new seed each time their software is run while others may roll seeds more often, such as every hour. This may be useful for longer running software that uses the system so that the seed changes periodically to thwart attacks.

Continuing in block 320, the system provides the selected seed value to a checksum function that determines a checksum given an input seed and input data. The checksum function may be implemented in a module or other software package and may provide an interface, such as an application programming interface (API), that includes a method for providing the seed value.

Continuing in block 330, the system receives data to be inserted into a hash table. The data may include strings, binary data, or any other type of data that can be stored in a hash table. The system uses the data and seed to determine a key that is difficult for attackers to guess, and thus that distributes data in the hash table in a manner that is difficult to predict. This makes it more difficult to perform a denial of service attack that depends on overusing particular buckets of the hash table.

Continuing in block 335, the system breaks the received data into blocks, and selects the first block for processing by the checksum function. In subsequent iterations, the system selects the next block (e.g., word), using the output of the previous iteration as input to the next iteration. At the end of the data the system may pad the data to a suitable length, and add zero or more additional blocks with a fixed value. In one embodiment, the padding consists of a single nonzero byte followed by 4, 5, 6, or 7 bytes zero chosen such that the total length is a multiple of 4 bytes, and thus an integral number of blocks.

Continuing in block 340, the system computes the block checksum from the current checksum state and the data block selected in the previous step (see, e.g., FIG. 2). Preferably, the block checksum function provides good mixing of the data and checksum state, and high diffusion.

Continuing in decision block 345, if there are more blocks of data, or more blocks of padding, then the system loops to block 335 to process the next block of data, else the system continues to block 350. After the system has processed all of the blocks of input data, the system has computed an overall checksum value for the input data, and uses that value as a hash key for inserting the data into the hash table (a similar process can be used to look up or replace data in the hash table). In general, the attacker will not have access to the seed, and thus even if the attacker is aware of the data and the checksum function being used, the attacker will still not have enough information to determine the key under which the data will be stored. In some embodiments, the system uses a typical hashing function until a threshold number of collisions are detected, and then switches to using the randomized hashing function described herein. This may allow the system to achieve better performance until an attack is more likely, and then to thwart the attack by switching to a different hashing method.

Continuing in block 350, the system inserts the received data into the hash table by using the hash key calculated by the checksum function. The location into which the data is inserted is referred to as a hash bucket, and performance of the hash table may be determined in part by how many data items are placed in the same hash bucket. Because the system determines hash keys in a manner that has high diffusion and that is difficult to predict without knowing the seed value, users of the system can have high assurance that an attacker cannot perform a directed attack to intentionally fill particular hash buckets. After block 350, these steps conclude.

Figure 4:
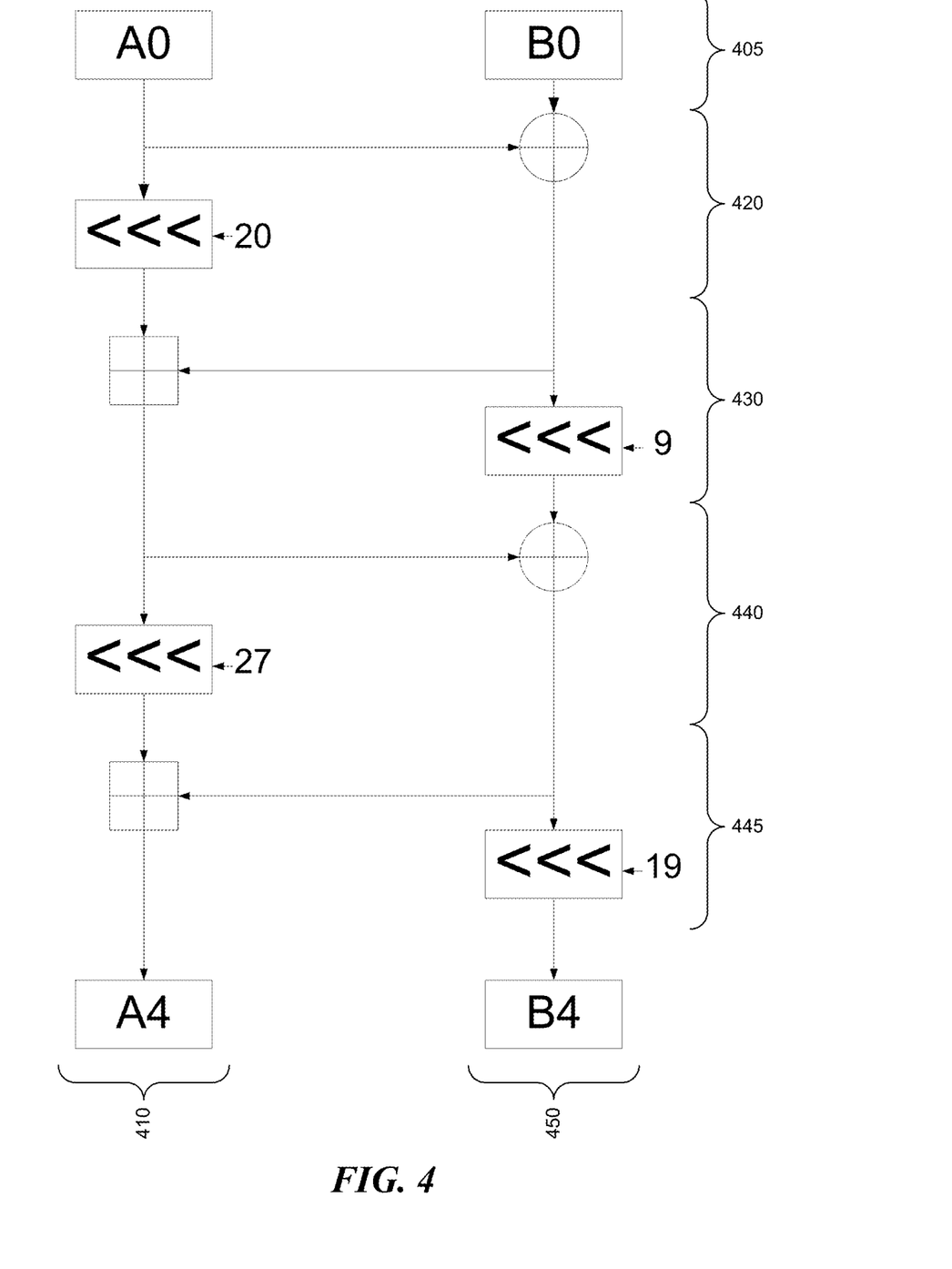
FIG. 4 is a data flow diagram that illustrates a single block pass of a checksum function for the resilient hashing system, in one embodiment.

FIG. 4 is a data flow diagram that illustrates a single block pass of a checksum function for the resilient hashing system, in one embodiment. The figure shows only the block processing after the data has been mixed into the checksum state. An input stage receives input data A0 and B0. B0 is either half of the seed value (for the first block) or half of the previous block result, while A0 is half of the seed or previous result combined with one word of the data input. In subsequent iterations, A0 may include the result of a XOR or addition operation on the output A4 of the last iteration combined with one block of input data. For example, the system may process data longer than four bytes by processing four bytes at a time in a block as shown. Output from each iteration feeds the next iteration and includes the next four bytes of input data. The block includes two parallel paths, a left path 410 and a right path 450. These represent instruction paths that can be executed in parallel by multiple processing units. The process performed is the same as that described serially with reference to FIG. 2. As shown, each path performs an instruction then provides output to the next stage, which can again be performed in parallel. In the first stage 420, the left is performing a rotation while the right is performing a logical XOR. In the second stage 430 the left is performing an add while the right is performing a rotation. In the third stage 440, the left is performing a rotation while the right is performing a logical XOR. In the fourth stage 445, the left is performing an add while the right is performing a rotation. Thus, after potentially four instruction cycles the result is available.

Figure 5:
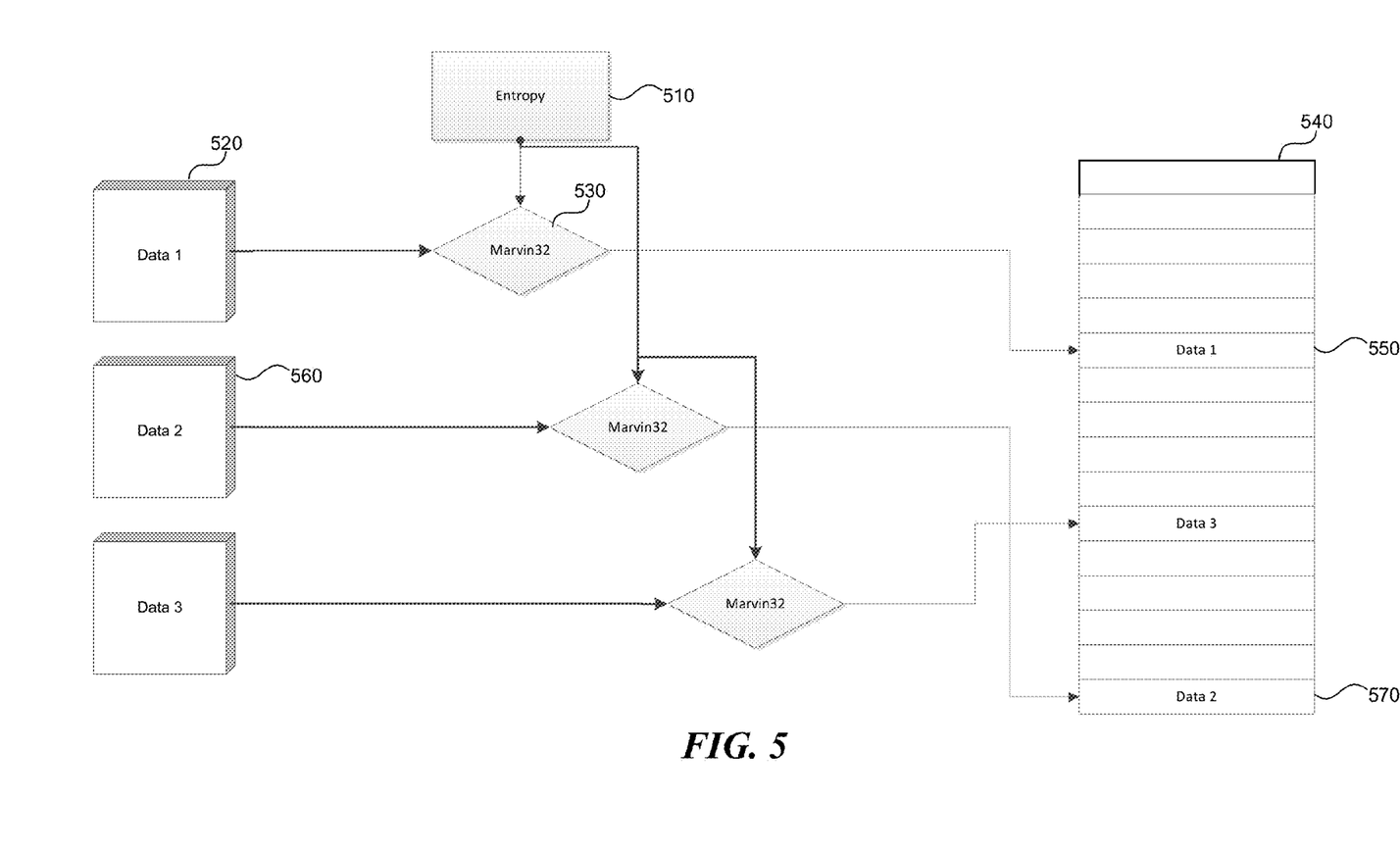
FIG. 5 is a block diagram that illustrates the use of the resilient hashing system with multiple data items to insert the data items into a hash table, in one embodiment.

FIG. 5 is a block diagram that illustrates the use of the resilient hashing system with multiple data items to insert the data items into a hash table, in one embodiment. The system receives entropy in the form of a seed 510 along with data items, such as a first data item 520. The system runs a checksum function 530, like Marvin32 described herein, to determine a hash key with which to insert the data into a hash table 540. Based on the determined hash key, the system inserts the first data item at location 550. To perform a successful denial of service attack, an attacker causes multiple data items to be placed in the same bucket in a hash table. However, because of the high diffusion and entropy used by the checksum function of the resilient hashing system, subsequent data items are placed at locations that an attacker cannot predict, and thus the attack is unsuccessful. For example, a second data item 560 is placed at location 570.

In some embodiments, the resilient hashing system applies padding to input data shorter than the native size of the checksum operation (e.g., four bytes). For example, the system may append 0x80 to the end of the data and add zeroes to bring the size of the data to a four-byte or other sized boundary.

In some embodiments, the resilient hashing system operates at different bit lengths. As described herein, the system can be implemented to operate at 32-bits, 64-bits, or other data size suitable for a particular implementation. The system can also operate with different rotation constants. As described above, one set of constants was selected as an example, but additional research may produce additional rotation constants with similar or better results. The output of the system as described produces two 32-bit values that can be combined to reach a 32-bit checksum, or can be combined to produce a 64-bit checksum.

In some embodiments, the resilient hashing system is applied to a common language library for strings and other data types. For example, the MICROSOFT™ .NET common language runtime (CLR) provides data types, such as "String", that include a GetHashCode function for getting hash keys. The techniques described herein can be applied to such implementations to generate less guessable hash keys. For example, the system can seed the checksum function with a different random value for each .NET application domain, so that each running program instance locates data in hash tables differently.

From the foregoing, it will be appreciated that specific embodiments of the resilient hashing system have been described herein for purposes of illustration, but that various modifications may be made without deviating from the spirit and scope of the invention. Accordingly, the invention is not limited except as by the appended claims.

We claim:

1. A computer-implemented method to determine a checksum of a single block of data, the method comprising:
   receiving a current checksum value, which includes a seed value for a first block or output of a previous block function for all subsequent blocks; where the seed value will cause an output checksum to vary from any previous operation using a different seed, making the output checksum value difficult for an attacker to guess;
   receiving one block of a block of input data for which the following steps will determine an output checksum for the block;
   performing a logical or arithmetic operation that combines the data block with some or all of the current checksum value to produce input to the block function (A0,B0);
   performing a logical operation that combines A0 and B0 to produce intermediate data B1;
   rotating the value A0 using a first rotation constant to produce intermediate data A1;
   adding intermediate data A1 and intermediate data B1 to produce intermediate data A2;
   rotating intermediate data B1 using a second rotation constant to produce intermediate data B2;
   performing a logical operation that combines intermediate data A2 and intermediate data B2 to produce intermediate data B3;
   rotating intermediate data A2 using a third rotation constant to produce intermediate data A3;
   adding intermediate data A3 and intermediate data B3 to produce intermediate data A4;
   rotating intermediate data B3 using a fourth rotation constant to produce intermediate data B4; and
   providing intermediate data A4 and intermediate data B4 as the output checksum value for the block,
   wherein the preceding steps are performed by at least one processor.

2. The method of claim 1 wherein the first rotation constant is 20, the second rotation constant is 9, the third rotation constant is 27, and the fourth rotation constant is 19.

3. The method of claim 1 wherein receiving the seed value comprises selecting the seed using a random process.

4. The method of claim 1 further comprising for input data longer than a length of the block of input data, dividing the input data into blocks, repeating the steps of the method for each block of input data using a result of the previous iteration as input for the next iteration, and outputting a final output checksum value as the checksum value of the last block.

5. The method of claim 1 wherein receiving input data comprises selecting a default seed value if no seed value is received as input.

6. The method of claim 1 wherein each logical operation to combine data is a logical XOR operation.

7. The method of claim 1 wherein rotating data includes a left rotation operation that can be implemented by modern central processing units (CPUs) as a single instruction.

8. The method of claim 1 wherein the rotation constants are selected to produce good diffusion of the output checksum value.

9. The method of claim 1 further comprising receiving the rotation constants as input or configuration data.

10. The method of claim 1 wherein each A value and each B value are determined in parallel by a superscalar CPU.

11. The method of claim 1 wherein each addition is performed with a modulo operation to regulate the size of the output data.

12. The method of claim 1 wherein providing the output checksum value comprises performing a logical XOR between A4 and B4 to produce a single value.

13. A computer system for providing checksum and hashing operations resilient to malicious input data, the system comprising:
   a processor and memory configured to execute software instructions embodied within the following components;
   an input receiving component that receives input data for which to determine a checksum value;
   a seeding component that receives or determines a seed value to use to randomize the checksum values produced by any particular instance of the system;
   a checksum component that computes a checksum value derived from the received input data and determined seed value using a Marvin32 checksum function;
   a data output component that provides the computed checksum value as output data to other components of the system or external components; and
   a hash table component that manages a hash table that uses the checksum value as a hash key.

14. The system of claim 13 wherein the input receiving component provides an application-programming interface through which users or other software can interact with the system to provide configuration, input, and to receive output data.

15. The system of claim 13 wherein the seed component receives the seed value from a user of the system.

16. The system of claim 13 wherein the seed component provides a default seed value to be used as the seed value if no seed value is received.

17. The system of claim 13 wherein the checksum component determines the checksum value in a manner that produces high diffusion of the checksum value for slight variations in the input data.

18. The system of claim 13 wherein the checksum component determines the checksum value in a manner that is difficult to guess for an attacker that has ready access to the data.

19. A computer-readable storage medium comprising instructions for controlling a computer system to insert data into a hash table using a resilient hash function, wherein the instructions, upon execution, cause a processor to perform actions comprising:
    selecting a seed value that will cause an output checksum to vary from any previous operation using a different seed;
    providing the selected seed value to a checksum function that determines a checksum given an input seed and input data;
    receiving data to be inserted into a hash table;
    determining a hash key by invoking the checksum function to calculate a hash key value that is derived from the selected seed value and received data;
    inserting the received data into the hash table by using the hash key calculated by the checksum function; and
    wherein the hash table uses a typical hashing function until a threshold number of collisions are detected, and then switches to using the checksum function.

* * * * *